(12) United States Patent
Imaeda (10) Patent No.: US 8,488,570 B2
(45) Date of Patent: Jul. 16, 2013

(54) COMMUNICATION METHOD, COMMUNICATION APPARATUS, AND COMPUTER PROGRAM

(75) Inventor: Eiji Imaeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1295 days.

(21) Appl. No.: 11/680,944

(22) Filed: Mar. 1, 2007

(65) Prior Publication Data

US 2007/0223511 A1 Sep. 27, 2007

(30) Foreign Application Priority Data

Mar. 23, 2006 (JP) .................. 2006-080907

(51) Int. Cl.
*H04W 4/00* (2009.01)
*H04W 72/00* (2009.01)
*H04B 1/00* (2006.01)

(52) U.S. Cl.
USPC ....... 370/338; 455/63.1; 455/114.2; 455/450; 455/426.1; 370/329

(58) Field of Classification Search
USPC ............. 455/552.1, 553.1, 426.1, 450–453, 455/63.1–65, 114.2, 114.3, 277.1, 278.1; 370/328, 329, 338
See application file for complete search history.

(56) References Cited

U.S. PATENT DOCUMENTS

| | | | |
|---|---|---|---|
| 5,740,167 A | | 4/1998 | Taketsugu et al. |
| 6,990,116 B1* | | 1/2006 | Young et al. .................. 370/445 |
| 2003/0125087 A1 | | 7/2003 | Shimizu |
| 2004/0259589 A1* | | 12/2004 | Bahl et al. .................. 455/553.1 |
| 2004/0264561 A1* | | 12/2004 | Alexander et al. ............ 375/232 |
| 2005/0135318 A1* | | 6/2005 | Walton et al. ................. 370/338 |
| 2006/0014536 A1* | | 1/2006 | Demirhan et al. ............ 455/434 |
| 2006/0045034 A1 | | 3/2006 | Kwon |
| 2006/0194601 A1* | | 8/2006 | Nandagopalan .............. 455/515 |
| 2007/0274280 A1* | | 11/2007 | Haas et al. ..................... 370/348 |

FOREIGN PATENT DOCUMENTS

| | | |
|---|---|---|
| JP | 5-048610 A | 2/1993 |
| JP | 08-274788 A | 10/1996 |
| JP | 2000-253017 A | 9/2000 |
| JP | 2002-158667 A | 5/2002 |
| JP | 2003-198564 A | 7/2003 |
| JP | 2004-336387 A | 11/2004 |
| WO | 2006022477 A1 | 3/2006 |

* cited by examiner

*Primary Examiner* — Sam Bhattacharya
*Assistant Examiner* — Daniel Lai
(74) *Attorney, Agent, or Firm* — Canon USA, Inc., IP Division (57) ABSTRACT

A method and apparatus for communicating between devices by selectively using a plurality of communication methods including a centralized control method, in which each communication apparatus sends and receives data under control of a control apparatus, and a distributed control method, in which each communication apparatus sends and receives data in an autonomous and distributing manner. The method and apparatus include detecting radio frequency interference, and switching between the centralized control method and the distributed control method according to a result of detecting the radio frequency interference.

13 Claims, 10 Drawing Sheets

COMMUNICATION METHOD, COMMUNICATION APPARATUS, AND COMPUTER PROGRAM

BACKGROUND OF THE INVENTION

1. Field of the Invention

The present invention relates to a communication method and a communication apparatus useful in the case where radio frequency interference occurs and to a program that causes a computer to perform the communication method.

2. Description of the Related Art

In recent years, a wireless local area network (LAN) system standardized as Institute of Electrical and Electronics Engineers (IEEE) 802.11 has a higher speed due to the introduction of IEEE 802.11b, IEEE 802.11g, and IEEE 802.11n, which exceeds 100 Mbps.

Furthermore, in order to cope with stream data transmission, IEEE 802.11e, which supports a Quality of Service (QoS) technique, has also been standardized.

The increase in speed and the relatively inexpensive cost to establish wireless LANs, the number of wireless LAN apparatuses installed and used in homes has increased. As a result of the increase in number of installed apparatuses has increased, so has the problem of potential radio frequency interference occurring between the apparatuses.

In the IEEE 802.11b and IEEE 802.11g wireless LAN systems, a wireless radio frequency band of the Industrial Scientific and Medical (ISM) band is used, which can also be used by a wireless apparatus other than a wireless LAN apparatus, i.e., wireless non-LAN apparatus. Accordingly, a radio frequency band used by a wireless non-LAN apparatus may overlap with a radio frequency band used by a wireless LAN apparatus, thus causing radio frequency interference.

In order to solve radio frequency interference occurring between wireless LAN apparatuses and between a wireless LAN apparatus and a wireless non-LAN apparatus, various methods have been proposed (see, for example, Japanese Patent Application Laid-Open No. 2002-158667 and Japanese Patent Application Laid-Open No. 2004-336387).

Radio frequency interference becomes especially problematic when performing a band-control type communication used in a stream data transmission. For example, in the case of a centralized control method in which an access control is performed based on polling from an access point to secure a band, if radio frequency interference occurs during sending and receiving of data, data communication may be delayed, and accordingly, a desired data communication rate may not be secured. As a result, a buffer underrun may occur in a receiving apparatus or a buffer overrun may occur in a sending apparatus.

U.S. Patent Application Publication No. US 2003/0125087 A1 (Japanese Patent Application Laid-Open No. 2003-198564), Japanese Patent Application Laid-Open No. 2000-253017, and Japanese Patent Application Laid-Open No. 08-274788 discuss methods for switching between a centralized control method and a distributed control method.

SUMMARY OF THE INVENTION

The present invention addresses strengthening a solution for a problem of data delay occurring when radio frequency interference occurs during a communication.

According to an aspect of the present invention, a method for communicating with another communication apparatus by selectively using a plurality of communication methods including a centralized control method, in which each communication apparatus sends and receives data under control of a control apparatus, and a distributed control method, in which each communication apparatus sends and receives data in an autonomous and distributed manner, includes detecting radio frequency interference, and switching between the centralized control method and the distributed control method according to a result of the detection.

According to another aspect of the present invention, a communication apparatus configured to communicate with another communication apparatus by selectively using a plurality of communication methods including a centralized control method, in which each communication apparatus sends and receives data under control of a control apparatus, and a distributed control method, in which each communication apparatus sends and receives data in an autonomous and distributed manner, includes a detection unit configured to detect radio frequency interference, and a switching unit configured to switch between the centralized control method and the distributed control method according to a result of the detection by the detection unit.

According to yet another aspect of the present invention, a computer-readable program for controlling a communication apparatus configured to communicate with another communication apparatus by selectively using a plurality of communication methods including a centralized control method, in which each communication apparatus sends and receives data under control of a control apparatus, and a distributed control method, in which each communication apparatus sends and receives data in an autonomous and distributed manner, causes a computer to perform operations including detecting radio frequency interference, and switching between the centralized control method and the distributed control method according to a result of the detection.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

First Exemplary Embodiment

Figure 1:
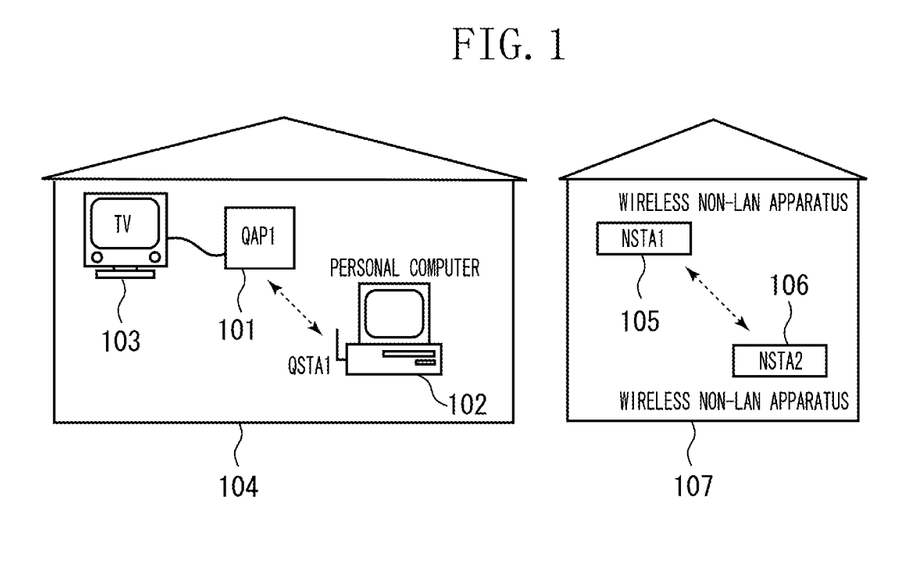
FIG. 1 illustrates a form of utilizing a wireless LAN according to a first exemplary embodiment of the present invention.

FIG. 1 illustrates a form of utilizing a wireless LAN according to a first exemplary embodiment of the present invention.

In the first exemplary embodiment, a wireless LAN is utilized in a user's house 104. In the user's house 104, an IEEE 802.11e-compliant QoS compatible access point (hereinafter referred to as "QAP1") 101 is installed. In addition, a personal computer 102, which is an IEEE 802.11e-compliant QoS compatible wireless LAN terminal apparatus (hereinafter referred to as "QSTA1"), is also installed. A television set 103 is connected to the QAP1 101 via a video cable.

The QSTA1 102 includes a wireless LAN unit. Thus, the QSTA1 102 functions as a wireless LAN terminal that wirelessly sends video data stored in a hard disk.

The QAP1 101 includes a function for managing an access by a wireless LAN terminal apparatus installed in a surrounding area. Furthermore, the QAP1 101 includes a decoding unit that decodes radio video data. Thus, the QAP1 101 decodes received video data and sends the decoded video data to the television set 103 as a video signal.

Both the QAP1 101 and the QSTA1 102 are wireless LAN apparatuses compliant with the IEEE 802.11g and IEEE 802.11e standards. Thus, the QAP1 101 and the QSTA1 102 can communicate with each other via a wireless LAN.

Note that in the IEEE 802.11e standard, two access control methods are defined, namely, an Enhanced Distributed Channel Access (EDCA) method and a Hybrid Coordination Function Controlled Channel Access (HCCA) system.

The EDCA method uses an autonomous distributed control, which is an expansion of a Carrier Sense Multiple Access with Collision Avoidance (CSMA/CA) method. More specifically, the EDCA method is an access control method in which in sending data by each wireless LAN terminal apparatus, a time taken for carrier sensing before sending data is set variable according to a priority level of data, and high priority data has a higher chance of being sent.

The HCCA method is a centralized-control access control method using polling. More specifically, in the HCCA method, a QoS access point (QAP) performs scheduling considering a priority level of each wireless LAN terminal apparatus (QSTA) and sends a polling frame to a QSTA. Each QSTA reads a permitted channel use time from the received polling frame, and sends data based on the read channel use time. Thus, the QSTA can secure a parameter for a specified band and a delay time to implement the QoS.

Turning back to FIG. 1, in a neighboring house 107, an NSTA1 105 and an NSTA2 106, which are wireless non-LAN apparatuses are utilized.

The NSTA1 105 and the NSTA2 106 respectively utilize the same band as a radio frequency band used by the QAP1 101 and the QSTA1 102, which are wireless LAN apparatuses. In addition, a transmission power of the NSTA1 105 and the NSTA2 106 is strong enough to reach the QAP1 101. Accordingly, the wireless communication between the NSTA1 105 and the NSTA2 106 may cause radio frequency interference against the QAP1 101 and the QSTA1 102.

Figure 2:
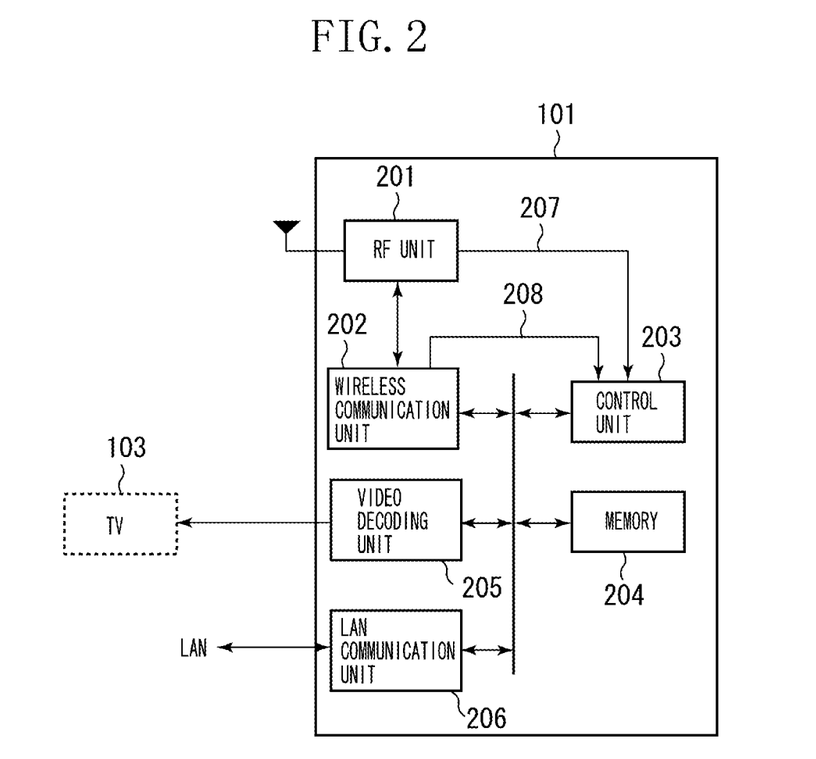
FIG. 2 illustrates an exemplary configuration of a QoS compatible access point (QAP1) according to the first exemplary embodiment of the present invention.

FIG. 2 illustrates an exemplary configuration of the QAP1 101. The QAP1 101 includes a radio frequency (RF) unit 201, a wireless communication unit 202, a control unit 203 that controls the entire QAP1 101, a memory 204, a video decoding unit 205, and a LAN communication unit 206.

The RF unit 201 performs processing for sending and receiving a radio wave in an operating radio frequency band. The RF unit 201 transfers a received signal to the wireless communication unit 202 and externally outputs a signal transferred from the wireless communication unit 202 as a radio wave. Furthermore, the RF unit 201, when detecting a radio wave, outputs a wireless power detection signal 207 to the control unit 203.

The wireless communication unit 202 performs processing for analyzing and assembling a media access control (MAC) frame for a wireless LAN signal. In addition, the wireless communication unit 202, when detecting data that cannot be recognized to be IEEE 802.11g-compliant, i.e., a wireless non-LAN signal, from a signal from the RF unit 201, outputs a wireless non-LAN apparatus detection signal 208 to the control unit 203.

Accordingly, the control unit 203 can, when receiving the wireless power detection signal 207 from the RF unit 201, determine which of a wireless LAN signal and a wireless non-LAN signal is received according to whether the control unit 203 receives the wireless non-LAN apparatus detection signal 208 from the wireless communication unit 202.

The memory 204 is used by a processing program for the control unit 203 as a work area. In addition, the memory 204 is used as a buffer area for communication data between the wireless communication unit 202 and the control unit 203, and between the LAN communication unit 206 and the control unit 203.

Data received by the RF unit 201 is frame-analyzed by the wireless communication unit 202. If the data received by the RF unit 201 is a wireless LAN signal, the data portion remaining after header information is removed from the data is transferred to and stored in a receiving buffer area in the memory 204.

The LAN communication unit 206 performs processing for analyzing and assembling a MAC frame for a LAN signal. When a LAN signal is received, the LAN communication unit 206 frame-analyzes the received LAN signal and transfers the data portion to a receiving buffer area in the memory 204.

The receiving buffer area in the memory 204 is reserved independently for each of received data from the wireless communication unit 202 and received data from the LAN communication unit 206. The size of the receiving buffer area to be reserved is determined according to the size of a frame body in the MAC frame to be received and a number of the MAC frames for the received data received during a time in which the control unit 203 makes a determination as to the transfer processing.

The control unit 203 determines a sending destination of the received data based on the header information analyzed by the wireless communication unit 202 or the LAN communication unit 206.

In the case of data addressed to its own apparatus (the QAP1 101), the control unit 203 reads the received data from the memory 204 and transfers the read data to the video decoding unit 205. Then, the video decoding unit 205 decodes the transferred data into a video signal, and sends the video signal to the television set 103 via a cable. Thus, a video signal is reproduced and displayed on a display of the television set 103.

When the sending destination is another terminal apparatus (QSTA) connected to the QAP1 101, the control unit 203 reads the received data from the memory 204 and transfers the read data to the wireless communication unit 202. Then, the wireless communication unit 202 reconstructs the transferred data into a wireless LAN frame, and then sends the frame via the RF unit 201.

When the sending destination is neither the QAP1 101 nor another terminal apparatus connected to the QAP1 101, the control unit 203 reads the received data from the memory 204 and sends the read data to the LAN communication unit 206. Then, the LAN communication unit 206 reconstructs the transferred data into a wired LAN frame, and then sends the frame to the LAN.

In the above-described configuration, when a user operates the QSTA1 102 and the television set 103 to send MPEG-2-coded video data from the QSTA1 102 using a wireless LAN, the video data received by the QAP1 101 is decoded into a video signal and is output to the television set 103. Then, the decoded video signal is displayed on a display screen of the television set 103. Note that because the data amount of the MPEG-2-coded video data is very large, the data is transferred in a stream transfer method in which the data is reproduced while being transferred instead of a transfer method in which the data is transferred in a unit of one file.

Figure 3:
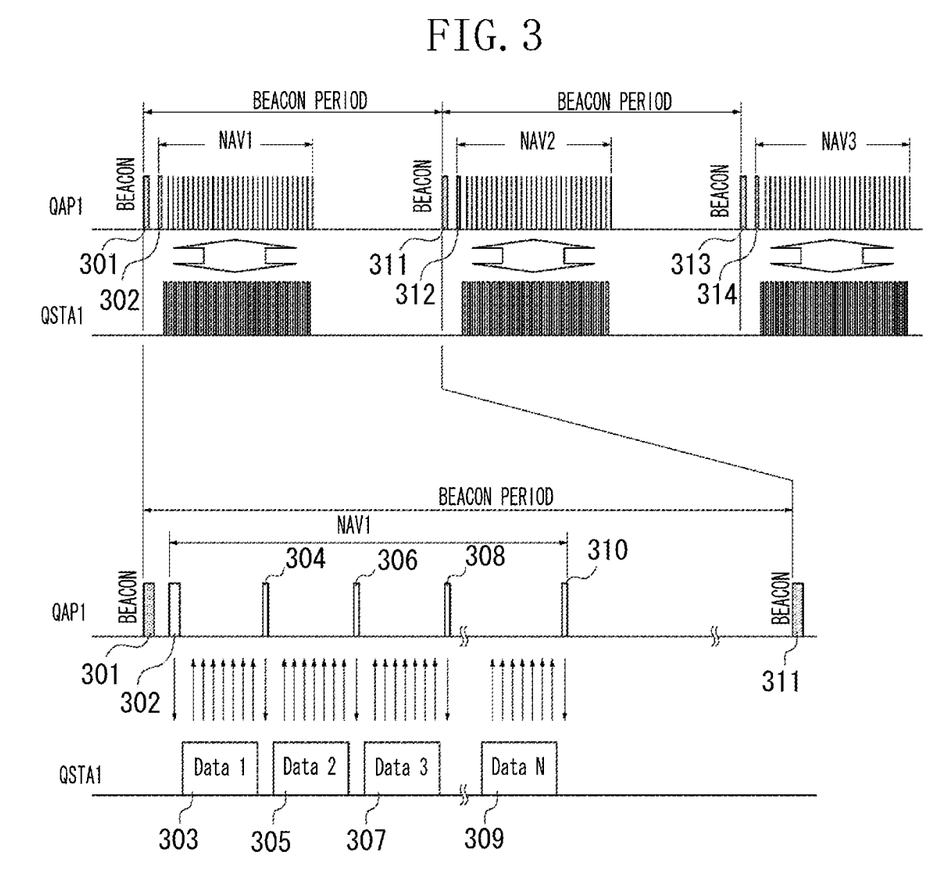
FIG. 3 illustrates an exemplary state of using a radio frequency band in a case where a Hybrid Coordination Function Controlled Channel Access (HCCA) method is used.

FIG. 3 illustrates a state of using a radio frequency band used in sending and receiving of data by each terminal apparatus in a form of utilization described above. Here, data is transmitted using the IEEE 802.11e-compliant HCCA method.

Referring to FIG. 3, beacon signals 301, 311, and 313 are sent by the QAP1 101. QoS CF-Poll signals 302, 312, and 314 are polling signals sent by the QAP1 101 to the QSTA1 102 to provide the QSTA1 102 with an access authority. A QoS Data+CF-Ack signal 303 includes data sent by the QSTA1 102 to the QAP1 101 and a response command signal sent responsive to the QoS CF-Poll signal. QoS Data signals 305, 307, and 309 are data sent by the QSTA1 102 to the QAP1 101. Ack signals 304, 306, 308, and 310 are data sent by the QAP1 101 as an acknowledgment to the sent data from the QSTA1 102.

The QAP1 101 notifies information related to a network identifier (subsystem identification (SSID)) and a polling period previously scheduled by the QAP1 101 together with the beacon signals 301, 311, and 313. In addition, the QAP1 101 sends the QoS CF-Poll signals 302, 312, and 314 to the QSTA1 102 to notify a timing of sending data by the QSTA1 102.

Before sending the beacon signals 301, 311, and 313 and the QoS CF-Poll signals 302, 312, and 314, the QAP1 101 scans the operating frequency channel for a specific length of time, and after confirming that the channel is not currently used, sends the beacon signals 301, 311, and 313 and the QoS CF-Poll signals 302, 312, and 314. Accordingly, when a wireless LAN apparatus compliant to IEEE 802.11g and IEEE 802.11e is present in the same area, the QAP1 101 adjusts the timing of sending data so that no conflict occurs between them.

Furthermore, each of the QoS CF-Poll signals 302, 312, and 314 includes a parameter "Network Allocation Vector" (NAV) that indicates a period in which the QSTA1 102 can continuously send data. The QSTA1 102 is permitted to continuously send data during the period NAV. NAV1, NAV2, and NAV3 in FIG. 3 respectively indicate NAV periods notified using the QoS CF-Poll signals 302, 312, and 314.

The QAP1 101, using a Hybrid Coordinator (HC) function defined in the IEEE 802.11e standard, computes a necessary period NAV based on a data rate of video data to be transmitted, a communication rate at which two-way communication is available in a wireless LAN, and a beacon period, so as to perform scheduling.

The QSTA1 102, after receiving the QoS CF-Poll signal 302, determines that a sending authority is given to the QSTA1 102 and thus sends data using the QoS Data+CF-Ack signal 303. The QAP1 101, after receiving the QoS Data+CF-Ack signal 303, in order to notify the QSTA1 102 that the QAP1 101 has received data, sends the Ack signal 304 to the QSTA1 102. The QSTA1 102, after receiving the Ack signal 304, sends data using the QoS Data signal 305. After that, the QSTA1 102 sends data (the QoS Data signals 307 and 309) until the period NAV ends. In response to the data, the QAP1 101 sends the Ack signals 306 and 308.

Figure 4:
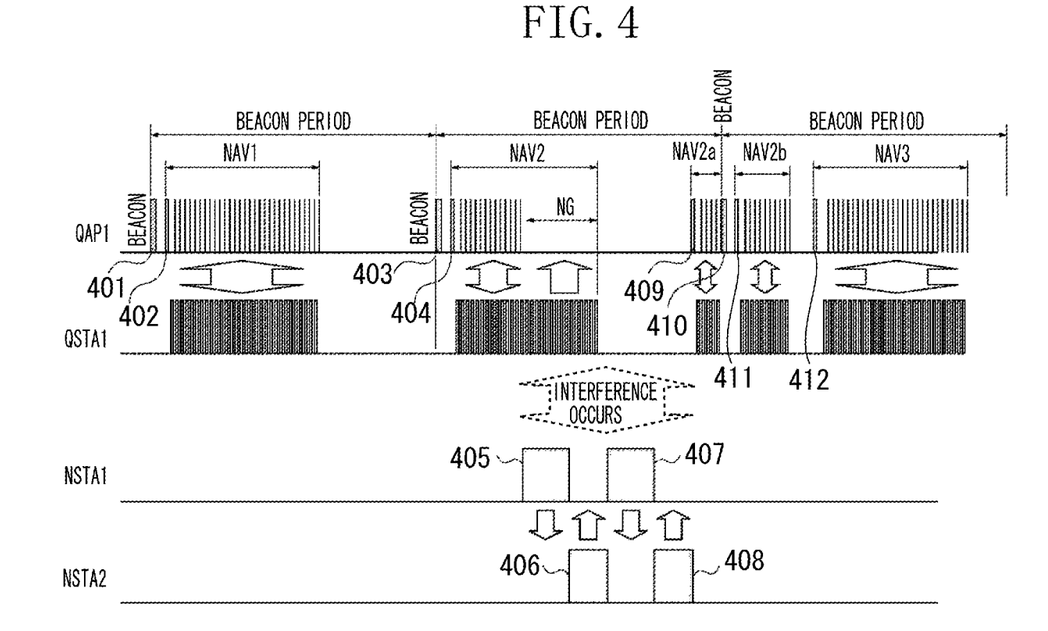
FIG. 4 illustrates an exemplary radio frequency band in a case where radio frequency interference occurs.

An operation performed when radio frequency interference occurs during an operation of the QAP1 101 in a conventional method will now be described with reference to FIG. 4.

As described above, the NSTA1 105 and the NSTA2 106 perform a wireless communication in the same radio frequency band as the radio frequency band used by the QAP1 101, in a method different from that of the IEEE 802.11 wireless LAN. Accordingly, as illustrated in FIG. 4, the NSTA1 105 and the NSTA2 106 send data at unique timings 405, 406, 407, and 408, regardless of whether data is sent by the QAP1 101 or the QSTA1 102.

Then, data 405, which is sent by the NSTA1 105, and data 406, which is sent by the NSTA2 106, collide with the data sent by the QSTA1 102. Thus, an interference occurs and, accordingly, the QAP1 102 cannot receive normal wireless data. As a result, the second half of the period NAV2 is suspended.

In this regard, the QAP1 101 newly schedules a period NAV2a in a period available before the next beacon 410 and sends a QoS CF-Poll signal 409 to provide the QSTA1 102 with a sending authority. If the period NAV2a is too short for a period for transferring residual data, which had been scheduled to be sent in the period NAV2, then the QAP1 101 again sends a QoS CF-Poll signal 411 after the beacon 410 to provide the QSTA1 102 with a period NAV2b and allows the QSTA1 102 to send the residual data.

With the above-described processing performed, a delay occurs in a transfer of data in the period NAV3, which has been scheduled immediately after the beacon 410. As a result, an underrun in a receiving buffer of the QAP1 101 occurs. Thus, a video signal to be reproduced on the television set 103 may either stop or be delayed.

Figure 5:
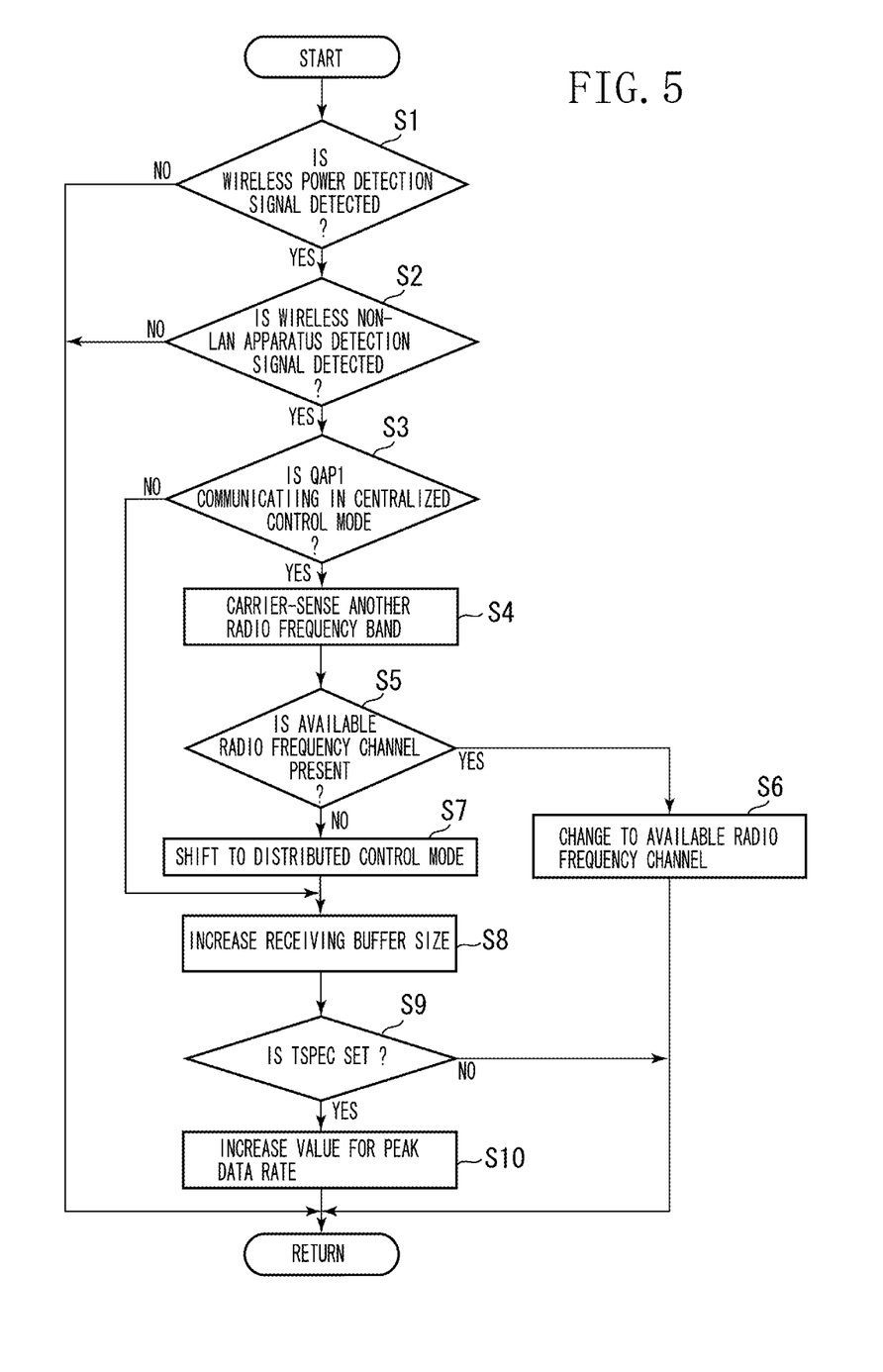
FIG. 5 is a flow chart illustrating an operation of the QAP1 according to the first exemplary embodiment of the present invention.

FIG. 5 is a flow chart illustrating an operation of the QAP1 101 according to the present embodiment, which is performed to prevent the defects described with reference to FIG. 4.

First, in step S1, the QAP1 101 determines whether the wireless power detection signal 207 is output by the RF unit 201. If no wireless power detection signal is detected in step S1 (No in step S1), the QAP1 101 ends this routine. If the wireless power detection signal 207 is detected in step S1 (Yes in step S1), then in step S2, the QAP1 101 determines whether the wireless non-LAN apparatus detection signal 208 is present. If no wireless non-LAN apparatus detection signal is detected in step S2 (No in step S2), the QAP1 101 ends this routine. If the wireless non-LAN apparatus detection signal 208 is detected in step S2 (Yes in step S2), the QAP1 101 determines that radio frequency interference caused by a wireless non-LAN apparatus is detected.

When radio frequency interference caused by a wireless non-LAN apparatus is thus detected, the processing branches according to whether the QAP1 101 is performing a communication in a centralized control mode (HCCA) (step S3). Note that in the case where the QAP1 101 is connected with a plurality of terminal apparatuses, the QAP1 101 determines that a communication is performed in the centralized control mode as long as the QAP1 101 is in communication with any one of the plural terminal apparatuses in the centralized control mode.

If it is determined in step S3 that the QAP1 101 is not communicating with another terminal apparatus in the centralized control mode (No in step S3), that is, if the QAP1 101 is communicating with another terminal apparatus in the distributed control mode (EDCA), then the processing advances to step S8.

If it is determined that the QAP1 101 is communicating with another apparatus in the centralized control mode (Yes in step S3), then in step S4, the QAP1 101 performs a confirmation of a use status (carrier sensing) with respect to a radio frequency channel different from an operating radio frequency channel.

For example, an IEEE 802.11g-compliant radio frequency currently available in Japan is within a band ranging from 2,400 MHz to 2483.5 MHz and a band ranging from 2,471 MHz to 2,497 MHz. A bandwidth of 26 MHz is occupied per each radio frequency channel. Accordingly, four frequency channels, at maximum, can be simultaneously used without interfering with one another.

If, as a result of the carrier sensing, it is determined that an available radio frequency channel is present (Yes in step S5), then in step S6, the QAP1 101 changes the radio frequency channel used by the QAP1 101 and the QSTA1 102 connected to the QAP1 101 to the available radio frequency channel, and then the QAP1 101 ends the processing.

If it is determined that no radio frequency channel is available (No in step S5), then in step S7, the QAP1 101 shifts from the centralized control mode (HCCA) to the distributed control mode (EDCA). Note that if a plurality of terminal apparatuses is connected to the QAP1 101, all the terminal apparatuses are switched to the distributed control mode (EDCA).

In the distributed control mode (EDCA), because the QSTA1 102 performs carrier sensing on the operating radio frequency channel and sends data if the channel is not used, the bandwidth is not secured, unlike the case of the centralized control mode (HCCA). Accordingly, the QAP1 101 operates so that data can be sent and received as much as possible when a chance of sending data is provided to the QSTA1 102.

In step S8, the QAP1 101 increases the size of the receiving buffer for the wireless communication unit 202 in the memory 204 so that receiving can be continuously performed even when a large amount of data is sent from the QSTA1 102 in one sending operation.

In step S9, the QAP1 101 determines whether the communication between the QAP1 101 and the QSTA1 102 is a traffic streaming, that is, whether a Traffic Specification (TSPEC) parameter, which is defined in the IEEE 802.11e standard, is set.

If it is determined in step S9 that the TSPEC parameter is set (Yes in step S9), then in step S10, the QAP1 101 operates to change a value for a "Peak Data Rate" in the TSPEC parameter to a larger value. More specifically, the QAP1 101 consults with the QSTA1 102 for a value to which the "Peak Data Rate" can be changed, and the QAP1 101 issues a notification to the QSTA1 102 so that the value for the "Peak Data Rate" is changed to a maximum value. After receiving the notification, the QSTA1 102 thereafter sends the data at the "Peak Data Rate" thus set. Accordingly, a large amount of data can thereafter be sent at once.

If it is determined that no TSPEC parameter is set in step S9 (No in step S9), the QAP1 101 ends this routine.

Figure 6:
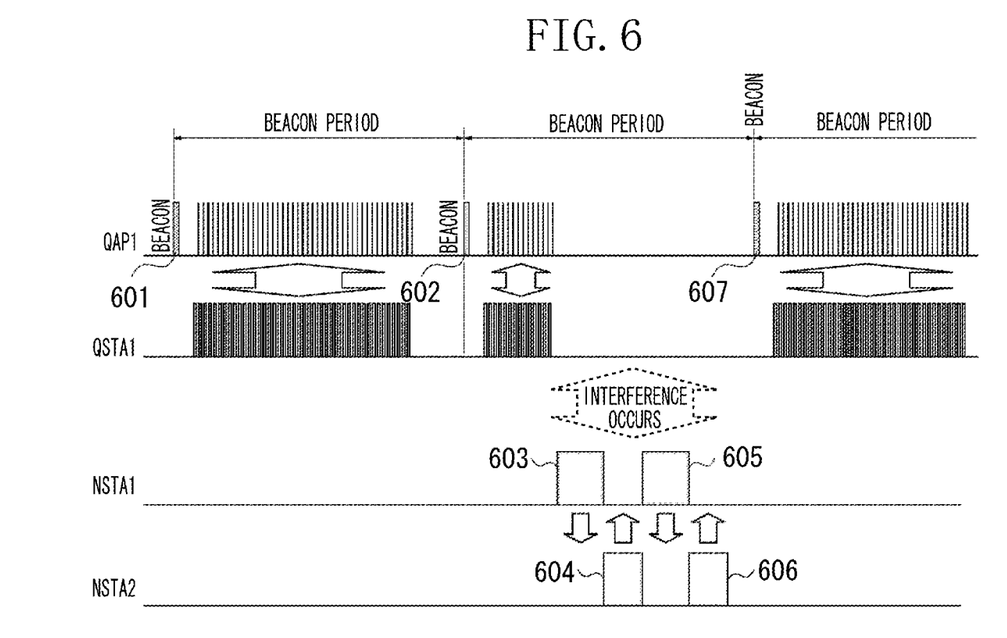
FIG. 6 illustrates an exemplary radio frequency band in a case where the first exemplary embodiment is applied.

FIG. 6 illustrates a state of use of a radio frequency channel by the QAP1 101 and the QSTA1 102 in the case where radio frequency interference is detected and the above-described operation is performed.

If, as a result of the carrier sensing of the operating radio frequency channel, it is determined that the channel is not currently used, the QSTA1 102, which is shifted to the distributed control mode (EDCA), sends video data at a newly set "Peak Data rate". The QAP1 101 performs receiving of video data up to a maximum capacity for storing data in the receiving buffer, the size of which has been increased. Because the rate of the MPEG-2 used for decoding by the video decoding unit 205 is the same as that in the centralized control mode (HCCA), a larger amount of video data than in the case of the centralized control mode (HCCA) is stored in the receiving buffer. Furthermore, the video decoding unit 205 serially decodes the received video data and outputs the decoded video data to the television set 103.

In addition, in periods 603, 604, 605, and 606, in which a data communication is performed between the NSTA1 105 and the NSTA2 106, which are wireless non-LAN apparatuses, no communication between the QAP1 101 and the QSTA1 102 is performed. During this period, the QAP1 101 reads the received data stored in the receiving buffer and allows the video decoding unit 205 to decode the data and to output the video signal to the television set 103.

If no data communication between the NSTA1 105 and the NSTA2 106 is detected, a video data communication between the QAP1 101 and the QSTA1 102 is resumed in the distributed control mode (EDCA).

According to the present embodiment, if radio frequency interference caused by a wireless non-LAN apparatus is detected during a period in which a streaming data communication is performed in the centralized control mode, the QAP1 101 shifts to the distributed control mode so that data is adaptively sent and received when an available radio frequency channel is present. Thus, a delay in a streaming data communication can be reduced to a minimum. In addition, a receiving buffer is increased and the speed of data transfer is increased as much as possible. Accordingly, a large amount of data can be sent and received at once when a communication time is available, without causing an overrun of the receiving buffer.

Second Exemplary Embodiment

A second exemplary embodiment of the present invention will now be described. In the first exemplary embodiment, video data is sent from a QoS compatible wireless LAN terminal apparatus (QSTA) to a QoS compatible access point (QAP) that is connected to a television set via a cable. In the second exemplary embodiment, video data is sent from an apparatus that is connected to a QAP via a cable to a QSTA.

Figure 7:
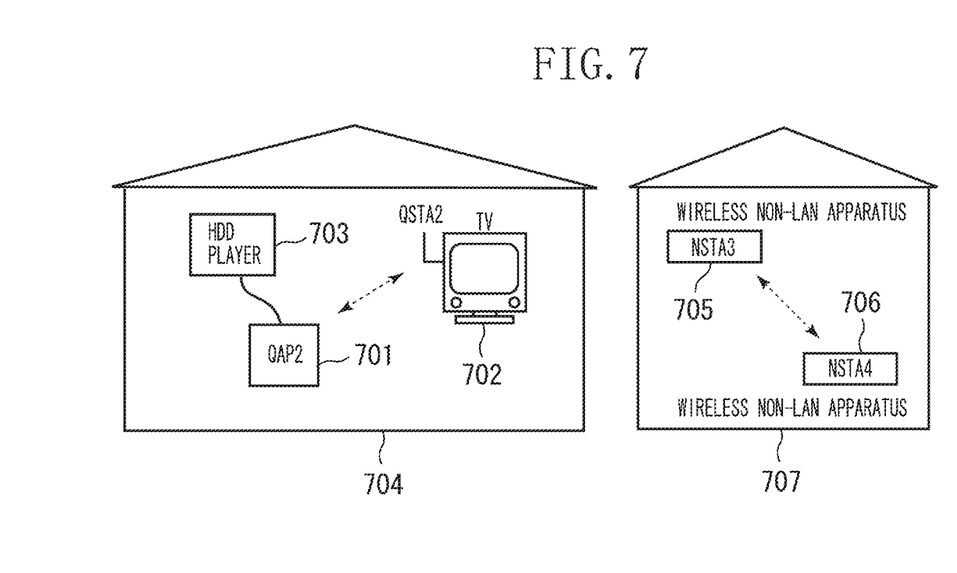
FIG. 7 illustrates a form of utilizing a wireless LAN according to a second exemplary embodiment of the present invention.

FIG. 7 illustrates a form of utilizing a wireless LAN according to the second exemplary embodiment.

In the second exemplary embodiment, a wireless LAN is utilized in a user's house 704. In the user's house 704, an IEEE 802.11e-compliant QoS compatible access point 701

(hereinafter referred to as "QAP2") is installed. In addition, a television set 702, which is an IEEE 802.11e-compliant QoS compatible wireless LAN terminal apparatus (hereinafter referred to as "QSTA2"), is also installed. A hard disk drive (HDD) recorder 703 is connected to the QAP2 701 via a video cable.

The QSTA2 702 includes a wireless LAN unit. Thus, the QSTA2 702 converts video data received via the wireless LAN into a video signal using an MPEG-2 decoding unit installed therein, and displays the video data on a television screen.

The QAP2 701 includes a function for managing an access by a wireless LAN terminal apparatus installed in a surrounding area. Furthermore, the QAP2 701 includes a decoding unit that decodes radio video data. Thus, the QAP2 701 decodes video data received from the HDD player 703 via a cable and sends the decoded video data to the QSTA2 702 via the wireless LAN.

Both the QAP2 701 and the QSTA2 702 are wireless LAN apparatuses compliant with the IEEE 802.11g and IEEE 802.11e standards. The QAP2 701 and the QSTA2 702 can communicate with each other via a wireless LAN.

In a neighboring house 707, an NSTA3 705 and an NSTA4 706, which are wireless non-LAN apparatuses, are utilized.

The NSTA3 705 and the NSTA4 706 respectively use the same band as a radio frequency band used by the QAP2 701 and the QSTA2 702, which are wireless LAN apparatuses. In addition, a transmission power of the NSTA3 705 and the NSTA4 706 is strong enough to reach the QAP2 701. Accordingly, the wireless communication between the NSTA3 705 and the NSTA4 706 may cause radio frequency interference against the QAP2 701 and the QSTA2 702.

Figure 9:
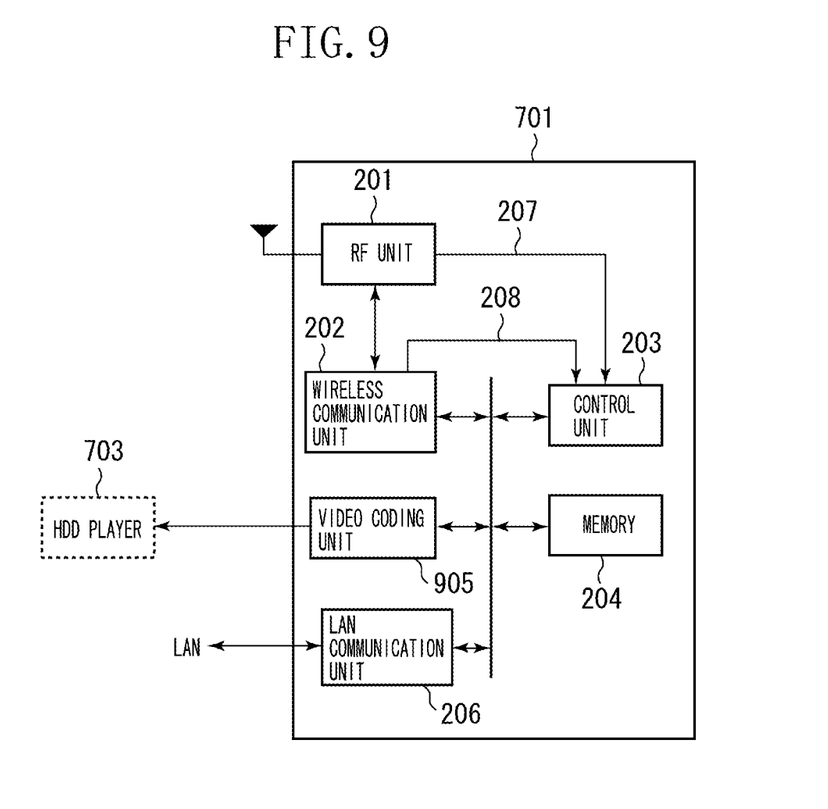
FIG. 9 illustrates an exemplary configuration of the QAP1 according to the second exemplary embodiment of the present invention.

FIG. 9 illustrates an exemplary configuration of the QAP2 701 according to the present embodiment. As compared to the example illustrated in FIG. 2, the QAP2 701 includes a video coding unit 905 instead of the video decoding unit 205. The other portions and units are similar to those illustrated in FIG. 2 and as such have the same reference numerals as in FIG. 2.

The video coding unit 905 encodes a video signal input from the HDD recorder 703 into video data and temporarily stores the coded video data in a sending buffer area in the memory 204.

In sending the video data to the QSTA2 702, the control unit 203 transfers the video data stored in the sending buffer area in the memory 204 to the wireless communication unit 202. The wireless communication unit 202 adds header information to the transferred data to compose a wireless LAN frame and sends the frame to the QSTA2 702 via the RF unit 201.

Figure 8:
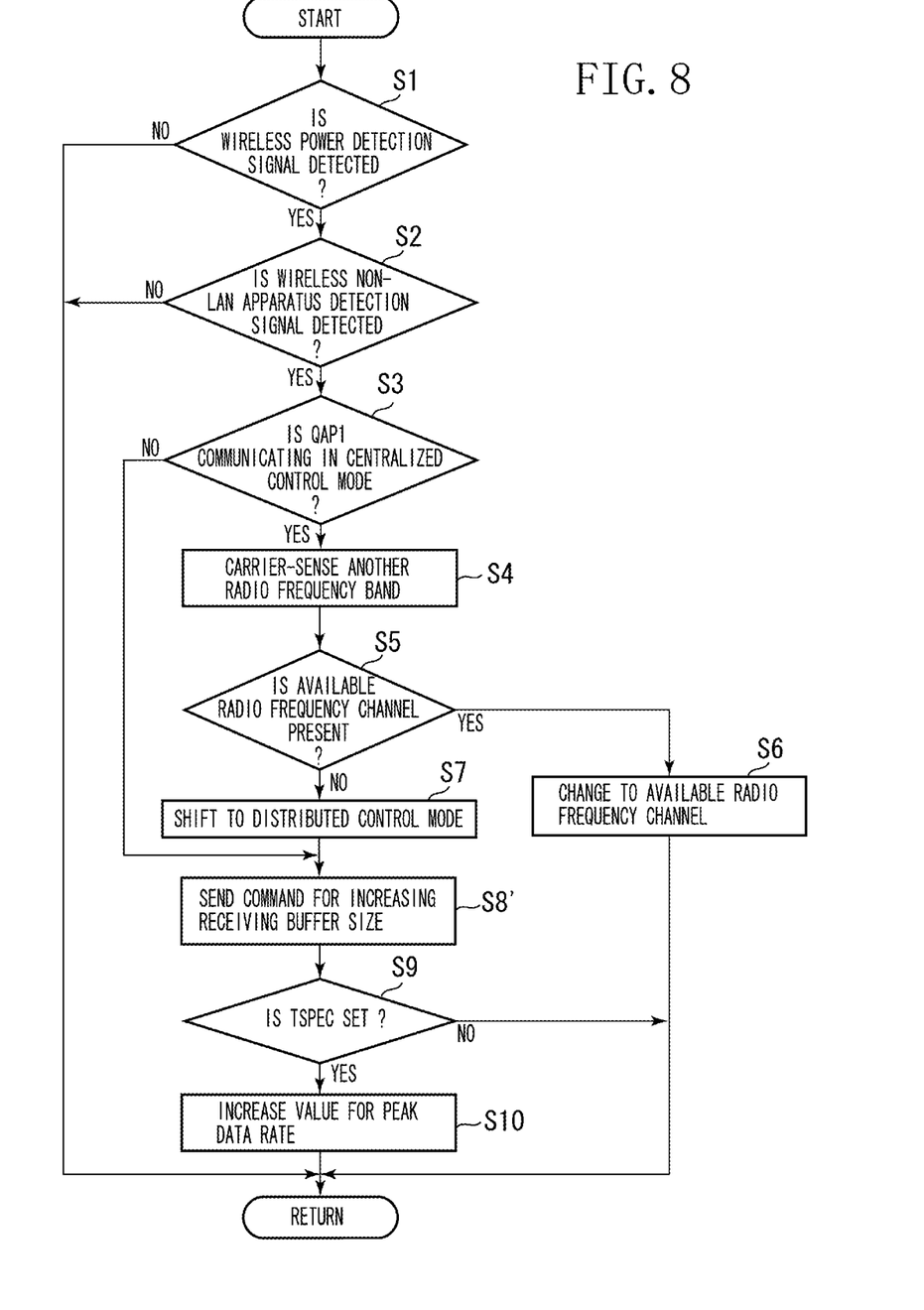
FIG. 8 is a flow chart illustrating an operation of the QAP1 according to the second exemplary embodiment of the present invention.

FIG. 8 is a flow chart illustrating an operation of the QAP2 701 according to the present embodiment. As compared to the example illustrated in FIG. 5, all of the steps of FIG. 8 are similar to those in FIG. 5, except for step S8 (S8' in FIG. 8), and as such have the same step numbers as FIG. 5.

In step S8', the QAP2 701 requests the QSTA2 702 to increase the size of the receiving buffer. After receiving the request, the QSTA2 702 increases the size of the receiving buffer. After that, when a chance of sending data is given to the QAP2 701, a large amount of data can be sent and received between the QAP2 701 and the QSTA2 702.

According to the present embodiment, even in the case of transmitting stream data from a QAP to a QSTA, an effect similar to that in the first exemplary embodiment can be achieved.

Third Exemplary Embodiment

A third exemplary embodiment of the present invention will now be described. In the first and second exemplary embodiments, the present invention is applied to an access point (QAP). However, the present invention can also be applied to a communication terminal apparatus (QSTA).

Furthermore, in the first and second exemplary embodiments, a wireless apparatus that may cause radio frequency interference is a wireless non-LAN apparatus. However, the present invention can also be applied to a case where interference occurs between wireless LAN apparatuses when a so-called "hidden node problem" occurs, as illustrated in FIG. 10.

Figure 10:
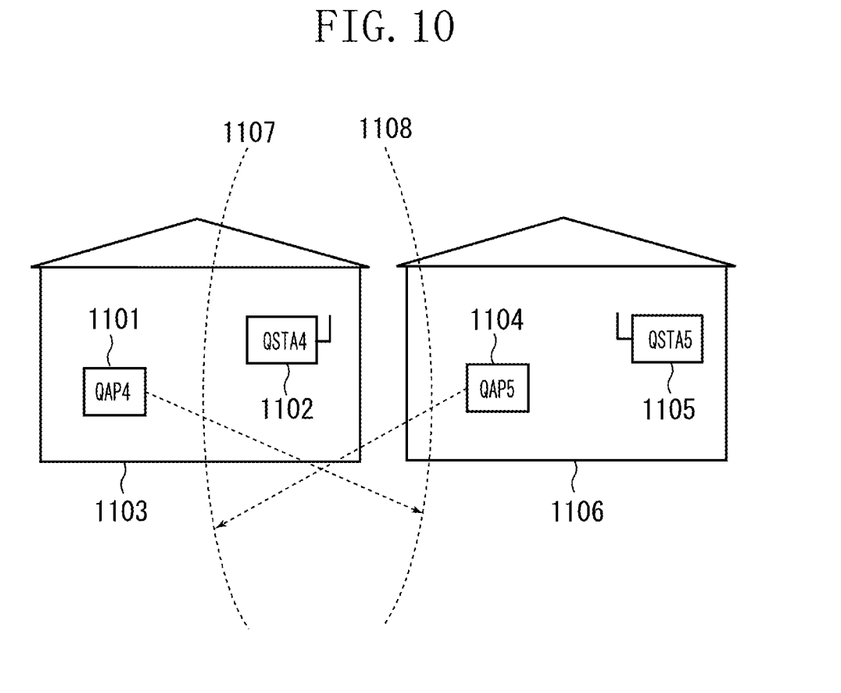
FIG. 10 illustrates a form of utilizing a wireless LAN in which a hidden node problem occurs.

Referring to FIG. 10, a QAP4 1101 and a QAP5 1104, which are access points, are installed in a user's house 1103 and a neighboring house 1106, respectively. In addition, a QSTA4 1102 and a QSTA5 1105, which are wireless LAN terminal apparatuses, are installed in the user's house 1103 and the neighboring house 1106, respectively. The QSTA4 1102 can wirelessly communicate with the QAP4 1101 in the HCCA mode. The QSTA5 1105 can wirelessly communicate with the QAP5 1104 in the HCCA mode.

A radio wave from the QAP4 1101 can reach an area 1108. In this state, the radio wave from the QAP4 1101 can be received by the QSTA4 1102, but cannot be received by the QAP5 1104. In addition, a radio wave from the QAP5 1104 can reach an area 1107. In this state, the radio wave from the QAP5 1104 can be received by the QSTA4 1102, but cannot be received by the QAP4 1101.

Accordingly, between the QAP4 1101 and the QAP5 1104, which are respectively installed at a position at which a radio wave from the other apparatus cannot reach each apparatus, each radio wave cannot be detected. Thus, both the QAP4 1101 and the QAP5 1104 asynchronously send a radio wave. As a result, the timing of sending of a signal from the QAP4 1101 and the timing of sending of a signal from the QAP5 1104 may overlap each other, thus causing radio frequency interference.

In this regard, if the QSTA4 1102 detects that a polling signal sent from the QAP4 1101 cannot be correctly received due to interference caused by a polling signal or a downlink data signal from the QAP5 1104, the QSTA4 1102 performs a method of preventing or reducing interference as described in the above-described exemplary embodiments.

According to the present embodiment, even when interference occurs between wireless LAN apparatuses due to a hidden node problem, an effect similar to that in the above-described embodiments can be achieved.

The detection of a hidden terminal is not limited to a detection at the timing of sending data. That is, the configuration can be arranged to detect that no sending authority can be given at the sending timing for which a band is previously reserved.

Other Exemplary Embodiments

In the above-described embodiments, the detection of radio frequency interference is performed using an RF unit of a wireless LAN apparatus. However, the present invention is not limited to this configuration. That is, the detection of radio frequency interference can be performed by independently providing a receiving unit that receives data in the same radio frequency band. In addition, the configuration can be arranged such that two systems of an RF unit and a wireless communication unit are provided, and one of the two systems is provided as a receiving unit dedicated for searching a radio frequency channel. In this case, channel searching processing is performed in parallel to the sending and receiving processing. Accordingly, the processing can be performed in a shorter length of time.

Both the receiving buffer and the sending buffer can be provided as a memory independently provided for communication, instead of a shared use with the work memory.

In the above-described embodiments, when the HCCA mode is used at the time when radio frequency interference is detected, the mode always shifts to the EDCA mode. However, the configuration can be arranged such that it is determined whether a periodicity in a stream communication using the HCCA mode can be maintained and, if a periodicity in a stream communication using the HCCA mode cannot be maintained, the mode shifts to the EDCA mode.

In addition, the configuration can be arranged such that, after performing a communication for a given length of time in the EDCA mode, the mode shifts back to the HCCA mode. Thus, after radio frequency interference is addressed, a streaming data communication can be periodically performed in the HCCA mode.

Furthermore, in the above-described embodiments, a television set or an HDD player is connected to a QAP via a cable. However, the QAP can include a function as a television set or a function as an HDD player.

Moreover, the wireless LAN is not limited to the IEEE 802.11g standard and can conform to any wireless standard (e.g., IEEE 802.11b). Alternatively, the wireless LAN can be configured to use another radio frequency band such as that in IEEE 802.11a.

While the above-described embodiments describe a wireless LAN, the present invention can be applied to a different wireless communication method that would enable practice of the present invention. In addition, in the above-described embodiments, a personal computer, a television set, and an HDD player are used. However, the present invention can be applied to other apparatuses that would enable practice of the present invention, such as a digital video camera.

The present invention can also be achieved by providing a system or an apparatus with a storage medium storing program code of software implementing the functions of the embodiments and by reading and executing the program code stored in the storage medium with a computer of the system or the apparatus (a central processing unit (CPU) or a micro processing unit (MPU)). In this case, the program code itself, which is read from the storage medium, implements the functions of the embodiments described above, and accordingly, the storage medium storing the program code constitutes the present invention.

As the storage medium for supplying such program code, a floppy disk, a hard disk, an optical disk, a magneto-optical disk, -a read-only memory compact disc (CD-ROM), a recordable compact disc (CD-R), a rewritable compact disc (CD-RW), a magnetic tape, a nonvolatile memory card, a read-only memory (ROM), and a digital versatile disc (DVD), for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

As described above, according to the embodiments of the present invention, when communication using the centralized control method is interfered with by radio frequency interference, the operating mode of a communication apparatus is switched to the distributed control method to adaptively send data at timings at which a radio frequency band is available. Accordingly, an underflow of scheduled receiving of data can be prevented or reduced. Furthermore, when a variance in the amount of flow of data increases due to irregular interferences occurring due to radio frequency interference, a capacity of a receiving buffer in the wireless communication apparatus is enlarged. Thus, communication can be continued while preventing an overflow of data in the wireless communication apparatus.

As described above, according to the embodiments of the present invention, the operating mode is switched from the centralized control method to the distributed control method according to a result of detection of radio frequency interference, and an amount of data that can be temporarily stored is controlled. Thus, a data delay and a buffer overflow in the communication apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-080907 filed Mar. 23, 2006, which is hereby incorporated by reference herein in its entirety.

What is claimed is:

1. A method for communicating between apparatuses by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the method comprising:

detecting radio frequency interference;

searching for an available radio frequency channel when a predetermined radio frequency interference is detected;

switching to the available radio frequency, when the available radio frequency is found when the predetermined radio frequency interference is detected when communicating with other communication apparatuses using the centralized control method;

switching from the centralized control method to the distributed control method, when the available radio frequency channel is not found when the predetermined radio frequency interference is detected when communicating with other communication apparatuses using the centralized control method;

temporarily storing received data; and increasing an amount of received data that can be temporarily stored when the centralized control method is switched to the distributed control method.

2. The method according to claim 1, further comprising increasing a maximum transmission rate when the centralized control method is switched to the distributed control method.

3. A communication apparatus configured to communicate with another apparatus by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the communication apparatus comprising:

a detection unit configured to detect radio frequency interference;

a searching unit configured to search for an available radio frequency channel when a predetermined radio frequency interference is detected a first switching unit configured to switch to the available radio frequency channel, when the available radio frequency is found when the predetermined radio frequency interference is detected when communicating with other communication apparatuses by the centralized control method;

a second switching unit configured to switch from the centralized control method to the distributed control method, when the available radio frequency is not found when the predetermined radio frequency interference is detected when communicating with other communication apparatuses by the centralized control method; and a storing unit configured to temporarily store received data, wherein an amount received of data that can be temporarily stored is increased, when the centralized control method is switched to the distributed control method.

4. The communication apparatus according to claim 3, further comprising a changing unit configured to increase a maximum transmission rate when the centralized control method is switched to the distributed control method.

5. A non-transitory computer-readable storage medium storing computer-executable instructions, which when loaded into a computer and executed by a communication apparatus configured to communicate with another apparatus by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the computer-executable instructions cause the communication apparatus to perform operations comprising:

detecting radio frequency interference;

searching for an available radio frequency channel when a predetermined radio frequency interference is detected;

switching to the available radio frequency channel, when the available radio frequency channel is found when the predetermined radio frequency interference is detected when communicating with other communication apparatuses using the centralized control method;

switching from the centralized control method to the distributed control method when the available radio frequency channel is not found when the predetermined radio frequency interference is detected when communicating with other communication apparatuses using the centralized control method;

temporarily storing received data; and increasing an amount of received data that can be temporarily stored when the centralized control method is switched to the distributed control method.

6. A method for communicating between devices by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the method comprising:

detecting radio frequency interference;

determining whether the radio frequency interference that is not compliant with a predetermined communication standard is detected;

executing processing for determining whether a communication method used for communication is the centralized control method or the distributed control method, when the radio frequency interference that is not compliant with the predetermined communication standard is detected when communicating with other communication apparatuses using the centralized control method; and adjusting the sending timing of sending data in the centralized control method, so that no conflict occurs between the radio frequency interference and the sending data when the radio frequency interference source is compliant with the predetermined communication standard when communicating with other communication apparatuses using the centralized control method.

7. The method according to claim 6, wherein the predetermined communication standard is IEEE 802.11 standard.

8. The method according to claim 6, further comprising increasing a maximum transmission rate when the centralized control method is switched to the distributed control method.

9. A communication apparatus configured to communicate with another apparatus by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the communication apparatus comprising:

a detection unit configured to detect radio frequency interference;

a determining unit configured to determine whether the radio frequency interference that is not compliant with a predetermined communication standard is detected;

an executing unit configured to execute processing for determining whether a communication method used for communication is the centralized control method or the distributed control method, when the radio frequency interference that is not compliant with the predetermined communication standard is detected when communicating with other communication apparatuses using the centralized control method; and an adjusting unit configured to adjust the sending timing of sending data in the centralized control method, so that no conflict occurs between the radio frequency interference and the sending data when the radio frequency interference source is compliant with the predetermined communication standard when communicating with other communication apparatuses using the centralized control method.

10. A non-transitory computer-readable storage medium storing computer-executable instructions, which when loaded into a computer and executed by a communication apparatus configured to communicate with another apparatus by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the computer-executable instructions cause the communication apparatus to perform a method comprising:

detecting radio frequency interference;
  determining whether the radio frequency interference that is not compliant with a predetermined communication standard is detected;
  executing processing for determining whether a communication method used for communication is the centralized control method or the distributed control method, when the radio frequency interference that is not compliant with the predetermined communication standard is detected when communicating with other communication apparatuses using the centralized control method; and
  adjusting the sending timing of sending data in the centralized control method, so that no conflict occurs between the radio frequency interference and the sending data when the radio frequency interference source is compliant with the predetermined communication standard when communicating with other communication apparatuses using the centralized control method.

11. A method for communicating between devices by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the method comprising:

detecting radio frequency interference;
  determining whether the radio frequency interference that is not compliant with a predetermined communication standard is detected;
  executing processing for determining whether a communication method used for communication is the centralized control method or the distributed control method, when the radio frequency interference that is not compliant with the predetermined communication standard is detected when communicating with other communication apparatuses using the centralized control method;
  temporarily storing received data; and
  increasing an amount of received data that can be temporarily stored when the centralized control method is switched to the distributed control method.

12. A communication apparatus for communicating between devices by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the communication apparatus comprising:

a detecting unit configured to detect radio frequency interference;
  a determining unit configured to determine whether the radio frequency interference that is not compliant with a predetermined communication standard is detected;
  an executing unit configured to execute processing for determining whether a communication method used for communication is the centralized control method or the distributed control method, when the radio frequency interference that is not compliant with the predetermined communication standard is detected when communicating with other communication apparatuses using the centralized control method; and
  a storage unit configured to temporarily store received data,
  wherein an amount of received data that can be temporarily stored is increased when the centralized control method is switched to the distributed control method.

13. A non-transitory computer-readable storage medium storing computer-executable instructions, which when loaded into a computer and executed by a communication apparatus configured to communicate between devices by selectively using a plurality of communication methods including a centralized control method, in which each communication apparatus sends and receives data according to an instruction issued based on a schedule providing sending timing of each of the communication apparatuses, from a control apparatus, and a distributed control method, in which each communication apparatus performs carrier sensing, and sends and receives data in an autonomous distributed manner, the computer-executable instructions cause the communication apparatus to perform a method comprising:

detecting radio frequency interference;
  determining whether the radio frequency interference that is not compliant with a predetermined communication standard is detected;
  executing processing for determining whether a communication method used for communication is the centralized control method or the distributed control method, when the radio frequency interference that is not compliant with the predetermined communication standard is detected when communicating with other communication apparatuses using the centralized control method;
  temporarily storing received data; and
  increasing an amount of received data that can be temporarily stored when the centralized control method is switched to the distributed control method.

* * * * *